United States Patent
Gluck et al.

(10) Patent No.: US 10,534,755 B2
(45) Date of Patent: Jan. 14, 2020

(54) WORD, PHRASE AND SENTENCE DEDUPLICATION FOR TEXT REPOSITORIES

(71) Applicant: International Business Machines Corporation, Armonk, NY (US)

(72) Inventors: Olympia Gluck, Haifa (IL); Itzhack Goldberg, Hadera (IL); Harry R. McGregor, Tucson, AZ (US); Christopher B. Moore, Vail, AZ (US); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 15/292,174

(22) Filed: Oct. 13, 2016

(65) Prior Publication Data
US 2018/0107678 A1    Apr. 19, 2018

(51) Int. Cl.
*G06F 16/174*    (2019.01)

(52) U.S. Cl.
CPC .................. *G06F 16/1748* (2019.01)

(58) Field of Classification Search
CPC ........... G06F 17/30156; G06F 16/1748; G06F 16/1752; G06F 16/2365
See application file for complete search history.

(56) References Cited

U.S. PATENT DOCUMENTS

| | | | |
|---|---|---|---|
| 5,809,502 A * | 9/1998 | Burrows | G06F 17/30622 |
| 5,963,965 A * | 10/1999 | Vogel | G06F 16/338 715/236 |
| 8,099,571 B1 | 1/2012 | Driscoll et al. | |
| 8,280,860 B2 | 10/2012 | Spackman et al. | |
| 8,407,193 B2 | 3/2013 | Gruhl et al. | |
| 8,442,942 B2 | 5/2013 | Leppard | |
| 8,488,916 B2 | 7/2013 | Terman | |
| 9,043,287 B2 | 5/2015 | Periyagaram et al. | |
| 9,146,935 B1 | 9/2015 | Agrawal | |
| 2003/0158850 A1 * | 8/2003 | Lawrence | G06F 16/313 |
| 2004/0122979 A1 * | 6/2004 | Kirkland | G06F 17/2205 709/247 |
| 2011/0035656 A1 * | 2/2011 | King | G06F 17/211 715/234 |

(Continued)

OTHER PUBLICATIONS

Constantinescu et al., "Mixing Deduplication and Compression on Active Data Sets", IBM Almaden Research Center, 2011 Data Compression Conference, © 2011 IEEE DOI 10.1109/DCC.2011. 46, pp. 393-402.

(Continued)

*Primary Examiner* — Cam Y T Truong
(74) *Attorney, Agent, or Firm* — Gilbert Harmon, Jr.

(57) ABSTRACT

An approach to de-duplicating data in an electronic text repository by performing the following steps: (i) processing one or more text documents associated with an electronic text repository to identify first instances of a plurality of words; (ii) adding words associated with the identified first instances of the plurality of words to a list, wherein each word added to the list is assigned a unique serial number; and (iii) replacing the plurality of words included in the one or more text documents with serial numbers corresponding to the words associated with the list for generating one or more reduced documents.

6 Claims, 8 Drawing Sheets

(56) References Cited

U.S. PATENT DOCUMENTS

| | | | |
|---|---|---|---|
| 2011/0055256 A1* | 3/2011 | Phillips | G10L 15/30 |
| | | | 707/769 |
| 2011/0264646 A1* | 10/2011 | Sokolan | G06F 17/30616 |
| | | | 707/711 |
| 2014/0163951 A1* | 6/2014 | Nikoulina | G06F 17/278 |
| | | | 704/4 |
| 2015/0227543 A1 | 8/2015 | Venkatesh et al. | |

OTHER PUBLICATIONS

Crochemore et al., "Pattern Matching and Text Compression Algorithms", King's College, London, UK, document printed on Aug. 25, 2016, 10 pages.

Sindhuja et al., "An Effective Digital Library With Deduplication Concept Using T3S Strategy", International Journal of Advanced Research in Biology Engineering Science and Technology (IJARBEST) vol. 2, Special Issue 13, April, © 2016 IJARBEST pp. 83-86.

Zhu et al., "Data De-duplication on Similar File Detection", 2014 Eighth International Conference on Innovative Mobile and Internet Services in Ubiquitous Computing, © 2014 IEEE DOI 10.1109/IMIS.2014.9, pp. 66-73.

* cited by examiner

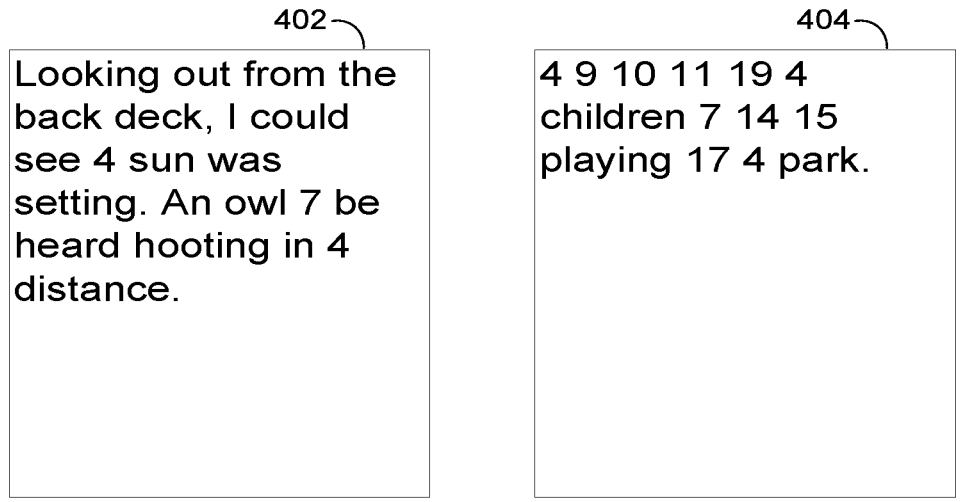
Fig. 4B

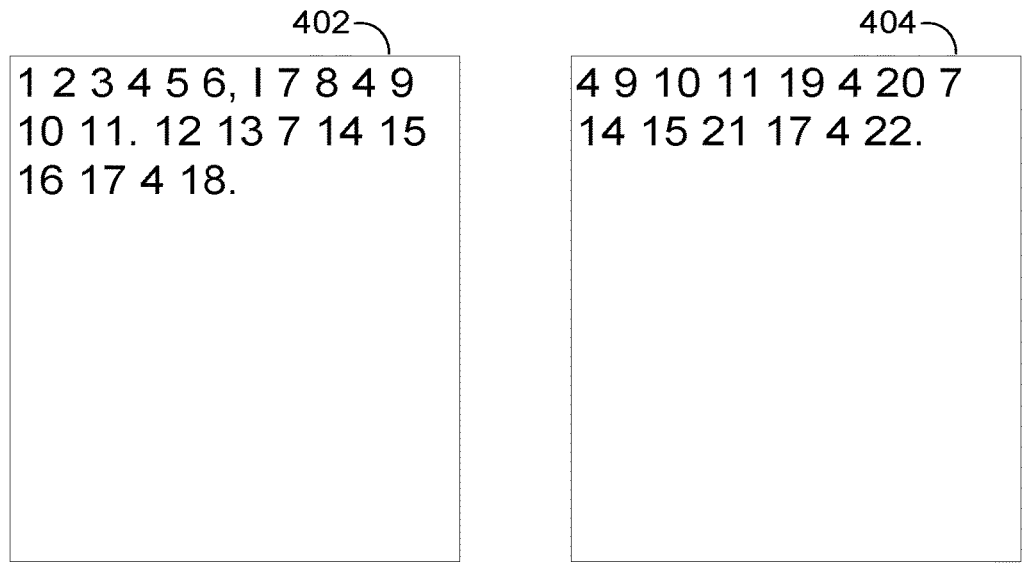
Fig. 4D

500

WORD, PHRASE AND SENTENCE DEDUPLICATION FOR TEXT REPOSITORIES

BACKGROUND

The present invention relates generally to the field of electronic text repositories, and more particularly to data de-duplication.

Electronic text repositories refer to digital collections of text documents, such as a library of electronic books (eBooks) on a reader device or a collection of documents created in word processing software, for example. Modern computing technology enables storage and on-demand access to the files associated with electronic text repositories, limited only by the storage capacity of the device being used. Data de-duplication generally refers to compression techniques used to limit the storage size of files and documents which have repeating, i.e., duplicate, data. Repeated words in a text document are an example of duplicate data. Data de-duplication enables an efficient use of storage space so that a greater number of files and documents can be stored for accessing and viewing on a computing device.

SUMMARY

According to an aspect of the present invention, there is a method, computer program product and/or system that performs the following steps (not necessarily in the following order): (i) processing, by one or more computer processors, one or more text documents associated with an electronic text repository to identify first instances of a plurality of words; (ii) adding, by the one or more computer processors, words associated with the identified first instances of the plurality of words to a list, wherein each word added to the list is assigned a unique serial number; and (iii) replacing, by the one or more computer processors, the plurality of words included in the one or more text documents with serial numbers corresponding to the words associated with the list for generating one or more reduced documents.

BRIEF DESCRIPTION OF THE DRAWINGS

FIG. 4B is the example text repository depicting word de-duplication, generated by the first embodiment system;

FIG. 4D is an example text repository depicting word de-duplication, generated by a second embodiment system;

DETAILED DESCRIPTION

Figure 1:
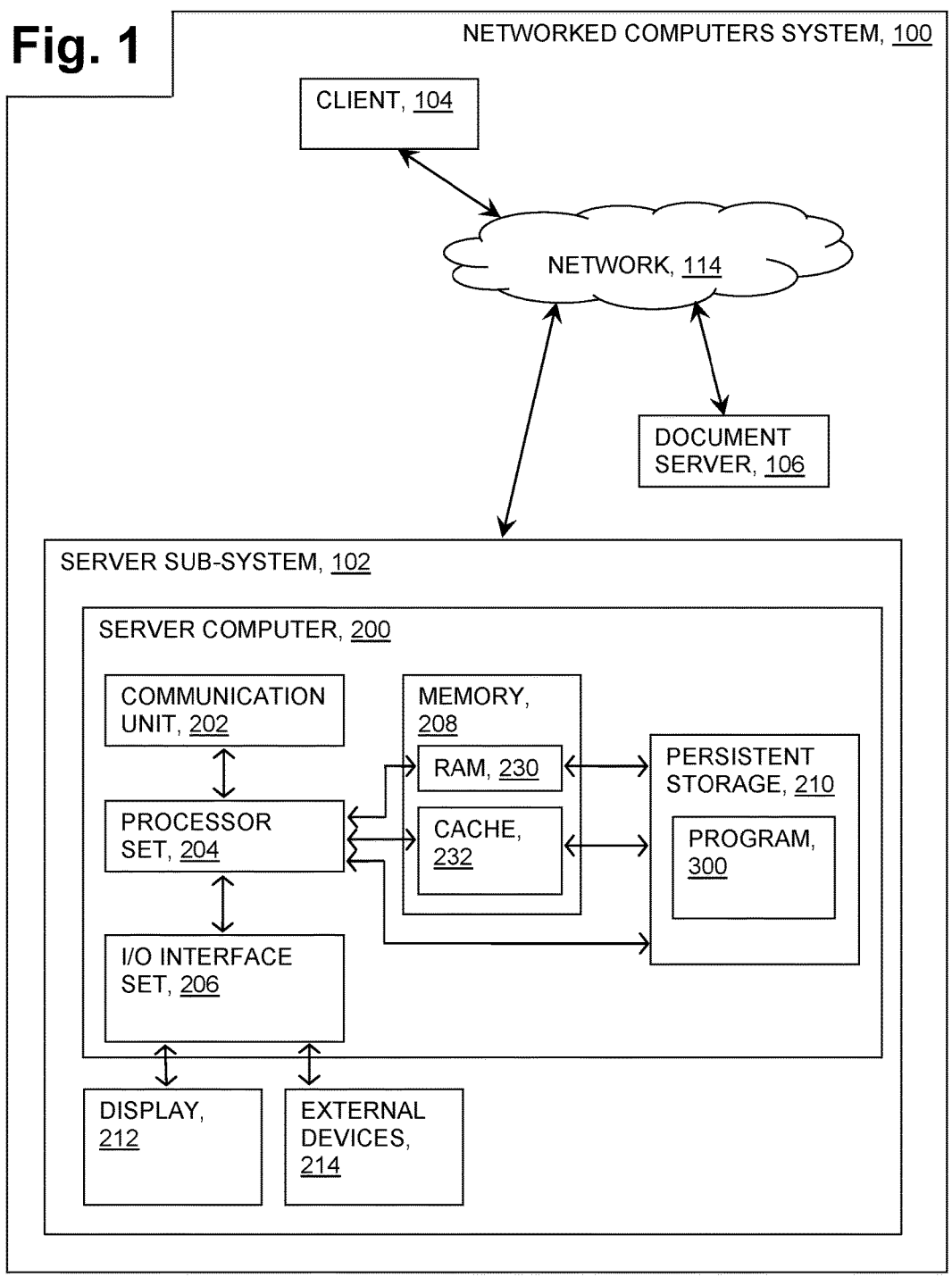
FIG. 1 is a block diagram view of a first embodiment of a system according to the present invention.

Embodiments of the present invention process words and characters in an electronic repository of text documents for de-duplicating words and phrases reoccurring throughout the documents, thereby reducing the storage size of the repository. This type of data de-duplication is well-suited to large collections of text based data, for example, eBook collections, and further enables improvements to bandwidth efficiency associated with the transfer of text based data. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client 104; document server 106; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Server sub-system 102 is, in many respects, representative of the various computer sub-system(s) in the present invention. Accordingly, several portions of server sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Program 300 is a collection of machine readable instructions and/or data that is used to create, manage and control certain software functions that will be discussed in detail, below, in the Example Embodiment sub-section of this Detailed Description section.

Server sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for server sub-system 102; and/or (ii) devices external to server sub-system 102 may be able to provide memory for server sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
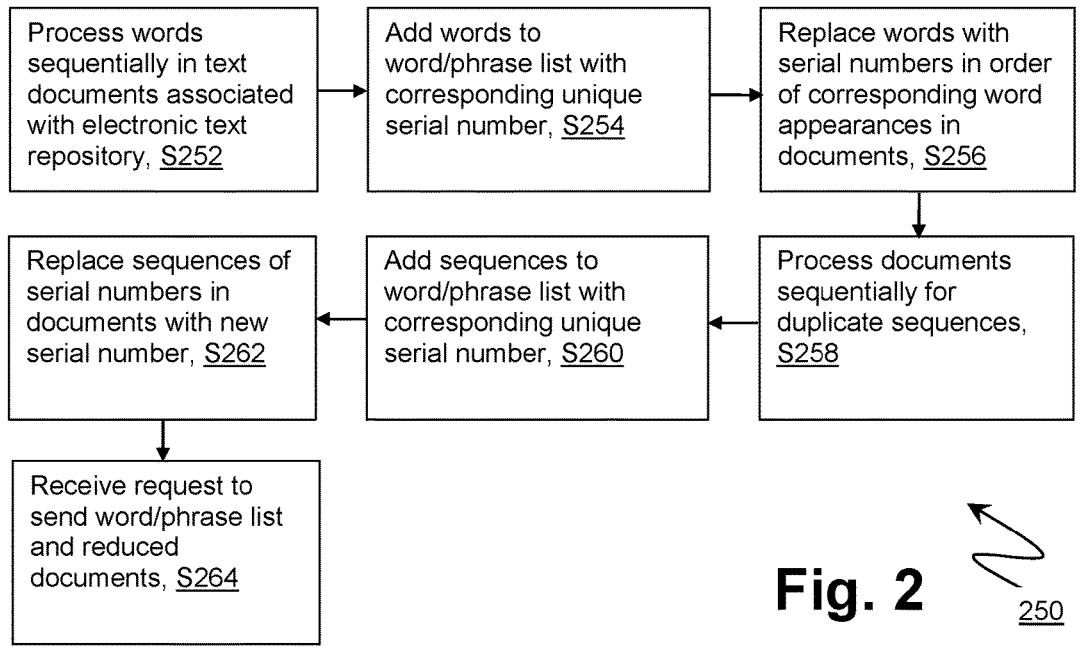
FIG. 2 is a flowchart showing a first embodiment method performed, at least in part, by the first embodiment system.
Figure 3:
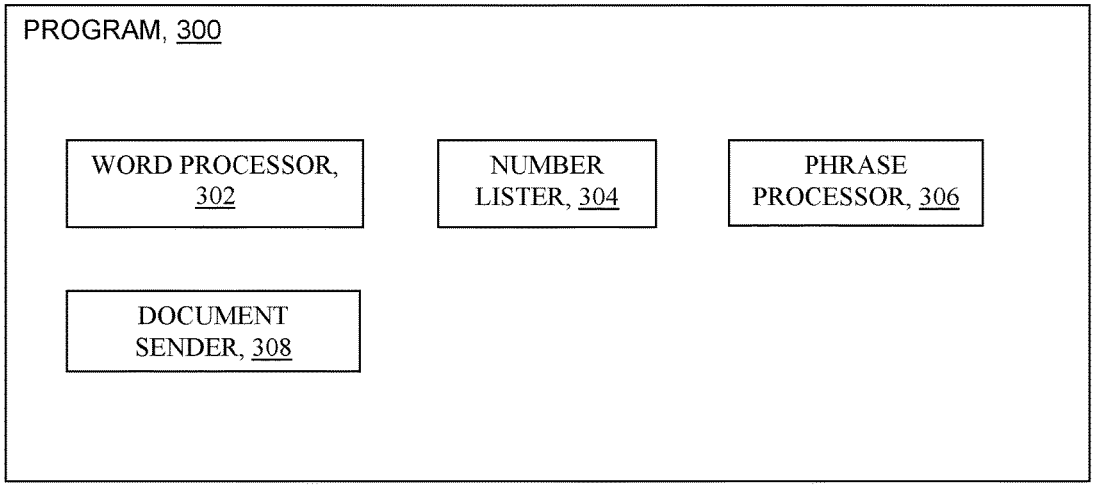
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S252 (see FIG. 2), where word processor module ("mod") 302 (see FIG. 3) processes words sequentially in one or more text documents associated with an electronic text repository, selected for data reduction (e.g., word and phrase de-duplication). The electronic text repository can be, but is not limited to, one or more text documents created with word processing software, one or more downloaded web pages, or a digital library of one or more electronic books (eBooks), e.g., eBooks downloaded from document server 106. For example, word processor mod 302 sequentially parses a first text document (e.g., word by word from start to finish) to identify a first instance of each new word, adding the first instance of each new word to a word/phrase list. Duplicate words, i.e., repeated appearances of a word following identification of the first instance of the word, are skipped over during processing of the first document and any subsequent documents associated with the electronic text repository. In some embodiments, single character words (e.g. "I" and "a") and punctuation marks are also skipped over during processing and not added to the word/phrase list.

It should be noted that in some embodiments, a client system (e.g., client 104) sends the electronic text repository and associated one or more text documents to server sub-system 102 for data reduction. Alternatively, document server 106 can send the electronic text repository and associated one or more text documents to server sub-system 102 for data reduction. In other embodiments, program 300 can be implemented on client 104 for data reduction of an electronic text repository.

Processing proceeds to operation S254, where word processor mod 302 adds each new word identified in the first text document to a word/phrase list, wherein each new word is assigned a unique, incrementing serial number to match its appearance order in the word/phrase list. When word processor mod 302 has finished processing the first text document and adding new words to the word/phrase list, word processor mod 302 starts sequentially processing words in a second text document associated with the electronic text repository. Upon identification of first instances of new words in the second text document (e.g., words not present in any previously processed documents, such as the first document), the new words are added to the word/phrase list and assigned unique serial numbers corresponding to their position in the word/phrase list. In some embodiments, word processor mod 302 continues processing all subsequent text documents for first instances of new words as previously described, wherein new words are added to the word/phrase list with corresponding unique serial numbers. As a result, upon completion of operation S254, the word/phrase list includes each unique word from the processed one or more text documents, along with a corresponding serial number for each word.

Processing proceeds to operation S256, where number lister mod 304 replaces, in order of corresponding word appearance, each word with its associated serial number from the word/phrase list in the one or more text documents associated with the electronic text repository. For a given word, the serial number replacing duplicate appearances of the given word can be, for example, a link pointing to the first instance of the given word in one of the processed text documents. Alternatively, every word in the one or more text documents, including the first instances of words, can be replaced with a corresponding serial number for referencing an entry in the word/phrase list. Replacing the serial numbers in this manner creates reduced documents, corresponding to the one or more text documents in the electronic text repository, with reduced storage sizes compared to the original one or more text documents.

Processing proceeds to operation S258, where phrase processor mod 306 sequentially processes the one or more reduced documents associated with the electronic text repository for duplicate sequences of words, serial numbers and/or single characters. For example, phrase processor mod 306 parses, from start to finish, the one or more text documents, identifying duplicate (i.e., occurring more than once) sequences of words, serial numbers and/or single characters left in place during processing. These duplicate sequences of words, serial numbers and/or single characters may represent, for example, repeated phrases or sentences used in at least one of the one or more text documents.

Processing proceeds to operation S260, where phrase processor mod 306 adds each identified duplicate sequence of words, serial numbers and/or single characters to the word/phrase list as a new entry with a corresponding unique serial number. The new entries associated with duplicate sequence of words, serial numbers and/or single characters added to the word/phrase list comprise the serial numbers and/or characters of each word and/or character in the sequence, along with the new serial number corresponding to the sequence as a whole.

Processing proceeds to operation S262, where number lister mod 304 replaces duplicate sequences of words, serial numbers and/or characters in the reduced documents with the corresponding serial numbers from the word/phrase list. For example, number lister mod 304 parses the reduced documents one by one, replacing duplicate sequences with the appropriate serial number associated with the sequence. This replacement of duplicate sequences with the corresponding serial numbers in the reduced documents further reduces the storage size for the reduced documents.

Processing proceeds to operation S264, where document sender mod 308 receives a request to send the word/phrase list and reduced documents. For example, client 104 sends server sub-system 102 a request, via communication network 114, directed towards program 300 for sending the electronic text repository and associated reduced documents. Responsive to receiving the request, document sender mod 308 sends one or more reduced documents (e.g., documents identified in the request) to client 104 via communication network 114. Because the reduced documents have a reduced storage size compared to the original one or more text documents, embodiments of the present invention also provide the advantage of generally increasing bandwidth efficiency associated with data transfer, i.e., it is more efficient with regard to bandwidth to transfer the reduced documents as opposed to the original (full size) one or more text documents associated with the electronic text repository. It should further be noted that in some embodiments, program 300 can be implemented on document server 106.

For example, in an embodiment where document server 106 is an eBook server which sends purchased eBooks to digital devices, program 300 (operational on document server 106) can reduce the storage size of one or more purchased eBooks before sending them to a customer, e.g., client 104.

It should be noted that viewing software used to view the reduced documents can replace the serial numbers listed in order in the reduced documents with the corresponding words, sentences or phrases. For example, in one embodiment, responsive to client 104 receiving one or more reduced documents and a corresponding word/phrase list, viewing software operational on client 104 uses the word/phrase list to replace each serial number in the one or more reduced documents with the appropriate word, phrase or sentence for viewing or reading, etc. In some embodiments, program 300 replaces the serial numbers in the one or more reduced documents with corresponding words or phrases using the word/phrase list for making the one or more reduced documents viewable.

Figure 4A:
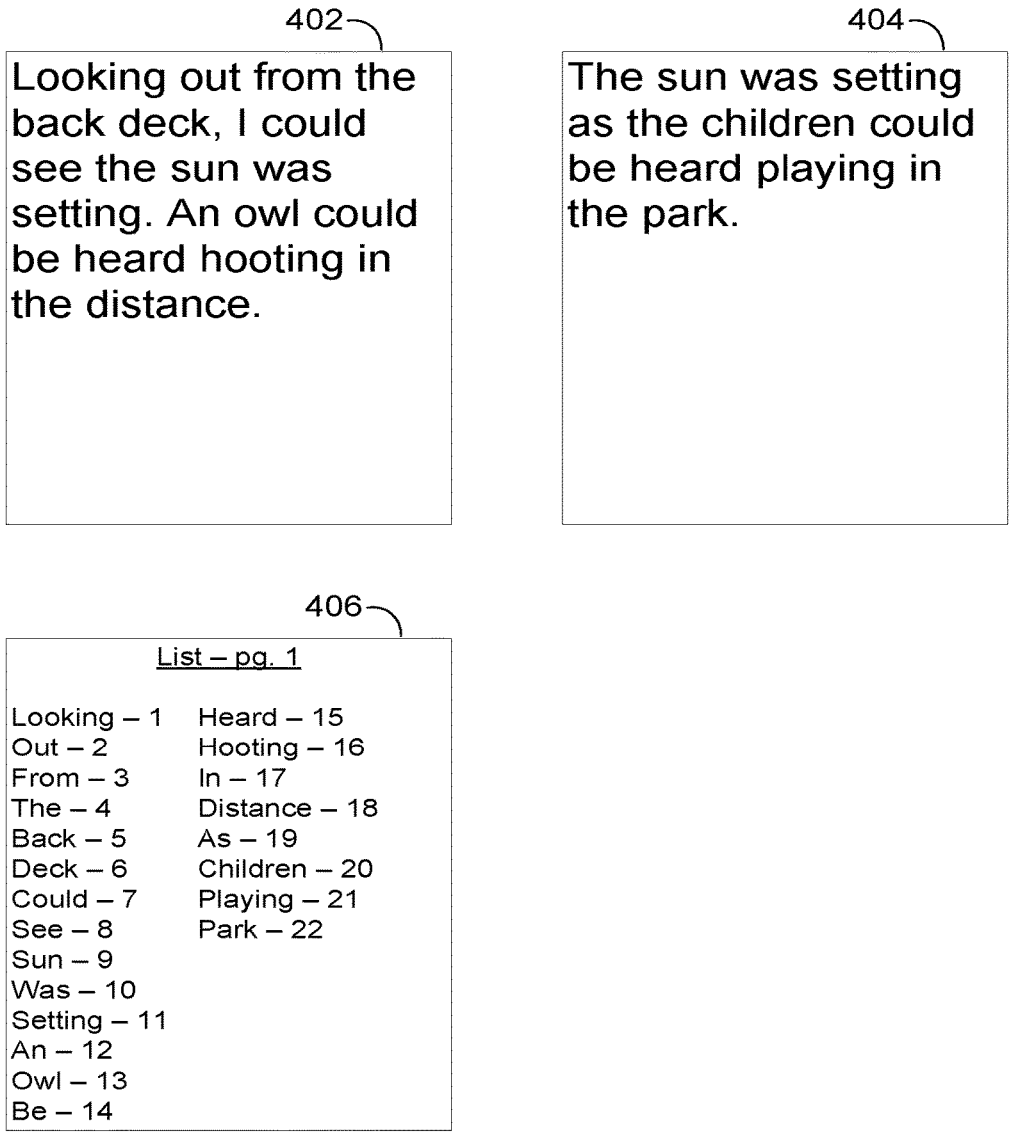
FIG. 4A is an example text repository and word/phrase list generated by the first embodiment system.

FIG. 4A depicts an example text repository, comprising text documents 402 and 404, selected for data reduction, in accordance with an embodiment of the present invention. Word processor mod 302 has sequentially processed text documents 402 and 404, adding each new word to word/phrase list, first page 406 upon identification of the first instance of each word in the text documents, as previously described. Each word on word/phrase list, first page 406 is assigned a unique, incrementing serial number, e.g., 1, 2, 3, etc. . . .

FIG. 4B depicts an example text repository comprising text documents 402 and 404 with word de-duplication, in accordance with an embodiment of the present invention. Duplicate instances of words from word/phrase list, first page 406 have been replaced with their corresponding serial number in text documents 402 and 404 for reducing the storage sizes associated with the documents. For example, repeated instances of "the" (following the first instance of the word in text document 402) have been replaced with the corresponding serial number "4" in text documents 402 and 404.

Figure 4C:
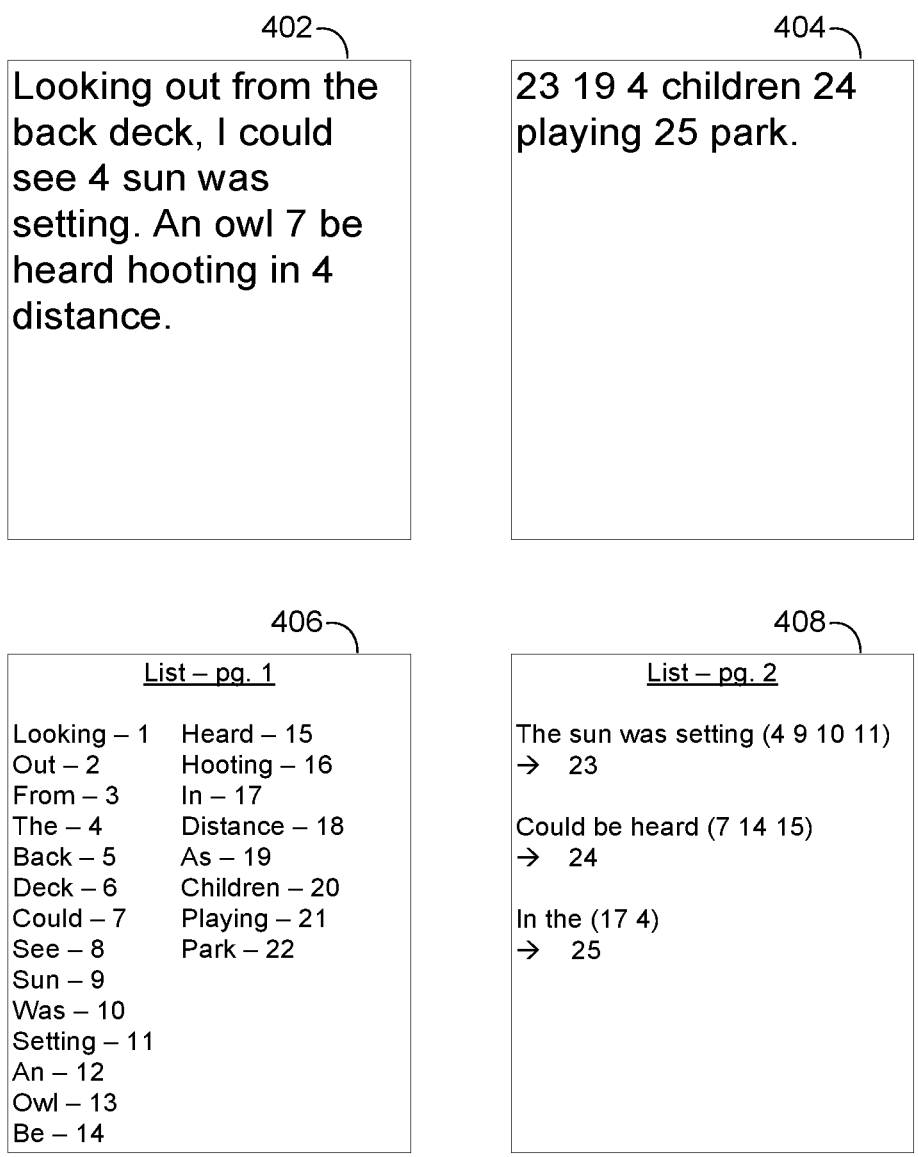
FIG. 4C is the example text repository depicting phrase de-duplication, generated by the first embodiment system.

FIG. 4C depicts an example text repository comprising text documents 402 and 404 with phrase de-duplication, in accordance with an embodiment of the present invention. Phrase processor mod 306 has sequentially processed text documents 402 and 404 for repeating phrases, e.g., repeated sequences of words, serial numbers and/or characters, and added the identified repeated phrases to word/phrase list, second page 408. For example, the sequence of serial numbers "4 9 10 11" in text document 404 (corresponding to the phrase "The sun was setting") has been replaced in FIG. 4C with the corresponding serial number "23" from word/phrase list, second page 408. As depicted in FIG. 4C, the entry for "The sun was setting" from word/phrase list, second page 408 comprises the complete phrase, the serial numbers associated with each word of the phrase and the new serial number corresponding to the whole sequence. It should be noted that the first identified instance of the phrase "The sun was setting" associated with the electronic text repository occurs in text document 402.

FIG. 4D depicts a reduced version of the electronic text repository of FIG. 4A, in accordance with another embodiment of the present invention. Number lister mod 304 has replaced all of the words in text documents 402 and 404, including the first instances of each word, with the corresponding serial numbers from word/phrase list, first page

406. Single character words and punctuation marks (e.g., "I", ".", etc.) have been left as their character in text documents 402 and 404.

Figure 4E:
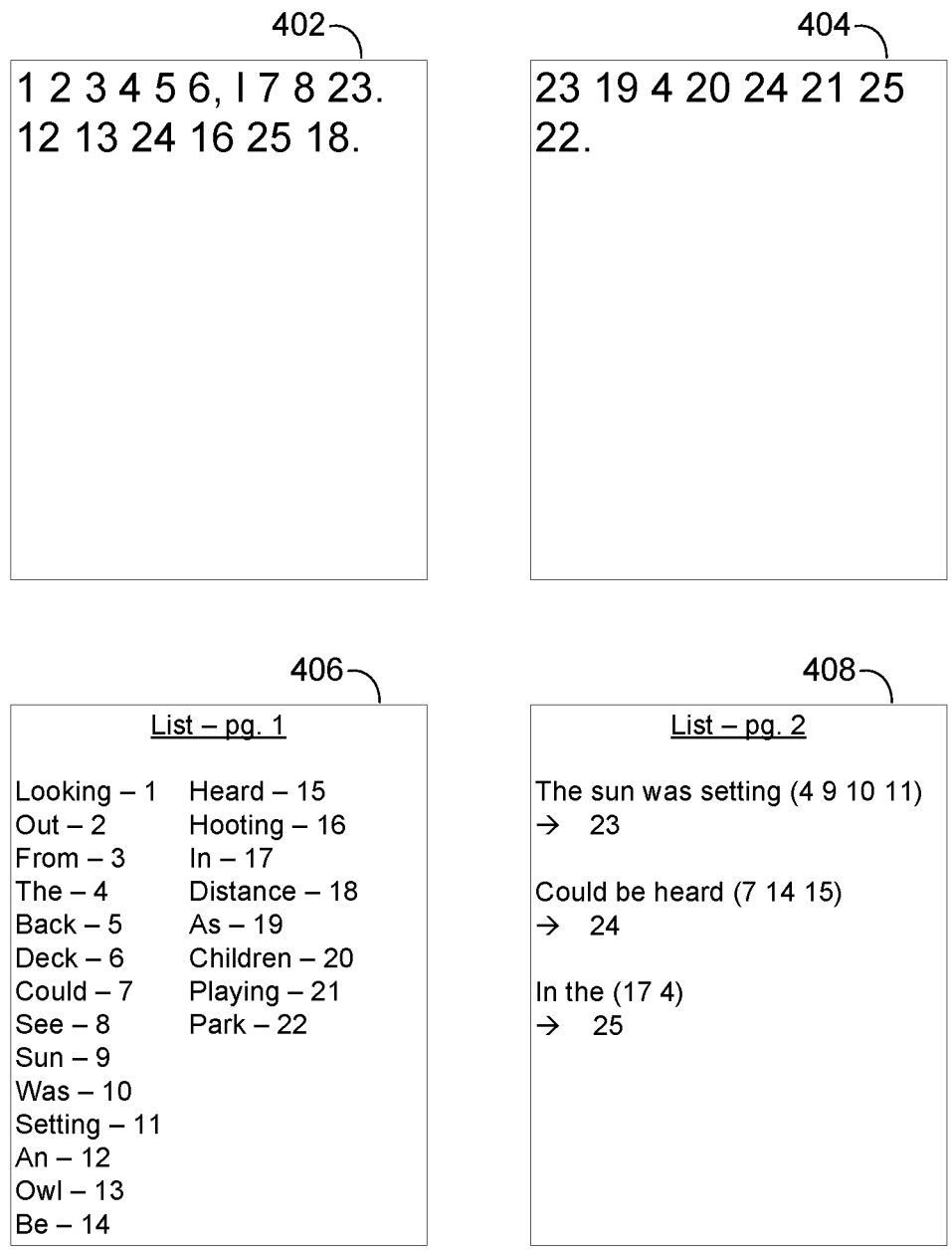
FIG. 4E is an example text repository depicting phrase de-duplication, generated by the second embodiment system.

FIG. 4E depicts a further reduced version of the electronic text repository of FIG. 4D, in accordance with an embodiment of the present invention. Phrase processor mod 306 has processed text documents 402 and 404 for duplicate (e.g., repeated) sequences of serial numbers and/or single characters and has added each duplicate sequence to word/phrase list, second page 408, each with a corresponding unique serial number. Number lister mod 304 has replaced each duplicate sequence, including the first instance of each sequence, with the associated corresponding unique serial number in text documents 402 and 404 for further data reduction. For example, the sequence of serial numbers "4 9 10 11" (corresponding to the phrase "the sun was setting") has been replaced with the corresponding unique serial number "23" from word/phrase list, second page 408.

It should be further noted that in some embodiments, the unique serial numbers corresponding to different words and sequences are not included in the word/phrase list. Each unique serial number is assigned to a word or sequence based on a line number of the corresponding word or sequence in the word/phrase list index, but the serial numbers need not be present in the list in such embodiments.

III. Further Comments and/or Embodiments

Some embodiments of the present invention recognize the following facts, potential problems and/or potential areas for improvement with respect to the current state of the art: (i) traditional text compression algorithms are effective for storing text libraries or repositories, but do not fully meet the potential available with de-duplication technologies; (ii) traditional de-duplication technologies work at a block level and utilize hash functions to ensure uniqueness within the data but neither of these are properties well suited to large collections of text based data; and (iii) given the amount of memory and computational resources available on even the most basic devices, there is benefit to be realized with the use of processes that are potentially less memory efficient but are more storage and bandwidth friendly.

Some embodiments of the present invention may include one, or more, of the following features, characteristics and/or advantages: (i) a method of storing text libraries that is efficient with regard to storage size and bandwidth; (ii) de-duplicating data in text libraries that factors in the unique properties of text and leverages them for extremely high levels of data reduction when combined with existing compression technologies; (iii) a method of reducing the storage consumption, and thus bandwidth requirements during data transfer, of text based libraries including multiple files or documents, e.g., electronic books (eBooks); (iv) repeated words, sentences and phrases in a library or repository of text documents can be removed and replaced with a link to the first instance of the word, sentence, and/or phrase; and (v) words, phrases, and sentences are assigned unique document and location identification numbers, and are assembled linearly in a reduced document.

As an example according to one embodiment, a collection of the following free eBooks: "War and Peace", "Great Expectations", "Peter Pan", "Grimms' Fairy Tales", and "Dracula" total almost 1.1 million words, but when reduced to just unique words, there are only approximately 43,000 words in total across the dissimilar works. Instances of repeated words can be stored in a list using a 16 bit incrementing identifier. This results in a ~360 KB "master" word list, and then 2.2 MB to store the ordered list of references for each document compared to the 5.8 MB needed for the unreduced text library. This reduced file size is realized before even applying phrase, sentence, and paragraph de-duplication to further reduce the amount of storage required and is completed prior to the use of standard compression algorithms to further reduce the amount of storage consumed.

Figure 5:
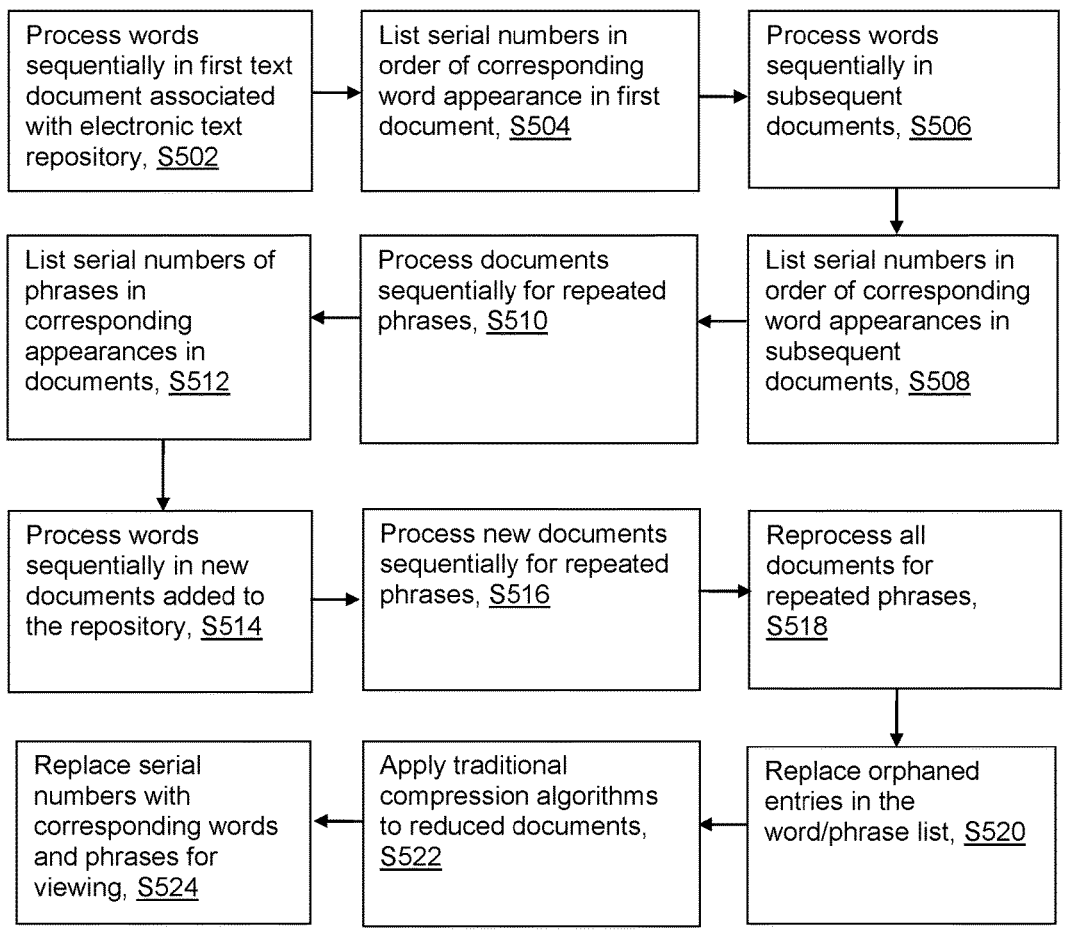
FIG. 5 is a flowchart of a second embodiment of a method according to the present invention.

In one embodiment, a method for reducing the amount of storage space required for a repository of text documents proceeds as follows, depicted as a flowchart 500 in FIG. 5. A text repository or eBook collection is selected for data reduction and the first document or eBook is selected. The first document or eBook is processed sequentially wherein upon the first instance of a unique word, each unique word is assigned an incrementing numerical serial number (S502). Depending on the number of unique words, this may be anywhere from a 12 bit number to a 16 bit number. The smallest value possible to store these numbers is used, based for example on an anticipated number of unique words present in the text repository or eBook collection. The words are stored in a shared repository level word/phrase list sequentially to match with their serial number. The reduced document is stored by listing in order the serial numbers which are later replaced by a viewing process with the corresponding word or phrase (S504). Single character words and punctuation marks are stored as their character in the original document, which occupy no more than 8 bits.

Referring still to the same embodiment, subsequent documents or eBooks from the text repository/eBook collection are selected for data reduction and the documents are processed sequentially (S506). Each word is compared against the word/phrase list and an incrementing numerical serial number will be assigned to a word only if it does not already have a serial number assigned. The new unique word is stored in the shared repository level word/phrase list sequentially to match with its serial number. The reduced documents are stored by listing in order the serial numbers which are later replaced by the viewing process with the corresponding word or phrase (S508).

In the same embodiment, once the word sequencing is completed for a text repository/eBook collection, an additional analysis for repeated phrases is conducted (S510). By conducting this across the entire repository or collection, the amount of data reduction and space savings is significantly enhanced. Duplicate sequences of serial numbers and characters that are next to each other in the reduced documents are further reduced with a new entry added to the word/phrase list. These entries comprise the serial numbers of each of the combined words and a new serial number replaces the original series of serial numbers in the reduced documents (S512). By using the existing serial numbers, significantly less storage space is consumed to hold these combined series of words in the word/phrase list than would be consumed by storing the entire series of words. This process is repeated until duplicate sequences, e.g., phrases or sentences, can no longer be found.

In the same embodiment, as new documents are added to the text repository/eBook collection, they are analyzed for new word instances which are added to the shared word/phrase list (S514). Analysis for repeated phrases or sentences is conducted and instances of repeated phrases or sentences are added to the shared word/phrase list (S516). The shared word/phrase list can be further tuned to reduce instances of word or phrase re-occurrence within the list by running an internal analysis of the list and reducing repeated word or phrase instances. Periodic document sequencing by running the identification process across all documents in the text repository/eBook collection can be initiated. Re-running the identification of phrases across the entire, now larger repository (i.e., a reprocessing), can find additional instances of duplicate phrases or series of words and characters within the existing documents, resulting in additional space savings (S518). The shared word/phrase list may be periodically scanned to determine if orphaned words or phrases exist that no longer exist in the documents held in the overall text repository/eBook collection. These orphaned entries can be pruned from the list by replacing the word or phrase with a newly added word or phrase, or with a null entry (S520). As the word/phrase list is indexed based on position within the file, lines associated with orphaned words or phrases are not deleted as it would change the serial number of all subsequent words, phrases or sequences of words and characters.

In some embodiments, once the final word/phrase list and reduced documents are finished processing, traditional compression algorithms can be optionally be applied (e.g., zip, lzw, gzip, etc.) (S522). This can be useful when combined with an archival process (zip, tar, or others) as now a single file can be transmitted that contains both the compressed word/phrase list and reduced document.

In an embodiment, the viewing process will load into memory the final word/phrase list and associate the "count" value for each word/phrase in memory. To render for viewing (or other uses, such as printing, or exporting) in a non-reduced format, the process sequentially processes the selected reduced document from the text repository/eBook collection, replacing each serial number with the appropriate word or phrase from the word/phrase list and leaving in place individual characters and punctuation that were stored in the reduced document (S524).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for de-duplicating data in an electronic text repository, the method comprising:

processing, by one or more computer processors, words sequentially in one or more text documents associated with the electronic text repository to identify first instances of a plurality of words while ignoring single character words and punctuation marks;

adding, by the one or more computer processors, the words associated with the identified first instances of the plurality of words to a list, wherein each word of the plurality of words added to the list is assigned a unique incrementing serial number matching word's order in the list;

replacing, by the one or more computer processors, the plurality of words included in the one or more text documents with the serial numbers corresponding to the words associated with the list for generating one or more reduced documents;

processing, by the one or more computer processors, the one or more text documents sequentially associated with the electronic text repository to identify first instances of one or more duplicate sequences;

adding, by the one or more computer processors, sequences associated with the identified first instances of the one or more duplicate sequences to the list, wherein each sequence of the sequences added to the list is assigned a unique serial number;

replacing, by the one or more computer processors, the sequences of serial numbers included in the one or more text documents with serial numbers corresponding to the sequences of serial numbers associated with the list for generating one or more further reduced documents, wherein the one or more duplicate sequences comprise at least one of words or serial numbers;

responsive to an addition of one or more new documents to the electronic text repository, processing, by the one or more processors, the one or more new documents to identify first instances of at least one of new words and new duplicate sequences;

reprocessing, by the one or more processors, the one or more text documents included in the electronic text repository, wherein sequences included in the one or more text documents are replaced with serial numbers corresponding to sequences newly added to the list;

adding, by the one or more processors, words and sequences associated with the identified first instances to the list, wherein the words and sequences added to the list are assigned unique serial numbers;

applying, by the one or more processors, compression algorithms to the one or more further reduced documents;

receiving, by the one or more computer processors, a request to send the one or more further reduced documents and the list;

responsive to the received request, sending, by the one or more computer processors, the one or more further reduced documents and the list to a user via a network.

2. The computer-implemented method of claim 1, further comprising: replacing, by the one or more computer processors, serial numbers included in the one or more further reduced documents with corresponding words and sequences associated with the list for making the one or more further reduced documents viewable.

3. A computer program product for de-duplicating data in an electronic text repository, the computer program product comprising a computer readable storage medium having stored thereon program instructions that are executed by one or more processors to:

process words sequentially in one or more text documents associated with the electronic text repository to identify first instances of a plurality of words while ignoring single character words and punctuation marks;

add the words associated with the identified first instances of the plurality of words to a list, wherein each word of the plurality of words added to the list is assigned a unique incrementing serial number matching word's order in the list;

replace the plurality of words included in the one or more text documents with the serial numbers corresponding to the words associated with the list for generating one or more reduced documents;

process the one or more text documents sequentially associated with the electronic text repository to identify first instances of one or more duplicate sequences;

add sequences associated with the identified first instances of the one or more duplicate sequences to the list, wherein each sequence of the sequences added to the list is assigned a unique serial number;

replace the sequences of serial numbers included in the one or more text documents with serial numbers corresponding to the sequences of serial numbers associated with the list for generating one or more further reduced documents, wherein the one or more duplicate sequences comprise at least one of words or serial numbers;

responsive to an addition of one or more new documents to the electronic text repository, process the one or more new documents to identify first instances of at least one of new words and new duplicate sequences;

reprocess the one or more text documents included in the electronic text repository, wherein sequences included in the one or more text documents are replaced with serial numbers corresponding to sequences newly added to the list;

add words and sequences associated with the identified first instances to the list, wherein the words and sequences added to the list are assigned unique serial numbers;

apply compression algorithms to the one or more further reduced documents;

receive a request to send the one or more further reduced documents and the list;

responsive to the received request, send the one or more further reduced documents and the list to a user via a network.

4. The computer program product of claim 3, further comprising: program instructions programmed to replace serial numbers included in the one or more further reduced documents with corresponding words and sequences associated with the list for making the one or more further reduced documents viewable.

5. A computer system for de-duplicating data in an electronic text repository, the computer system comprising: one or more processors; and a computer readable storage medium having stored program instructions that are executed by the one or more processors to:

process words sequentially in one or more text documents associated with the electronic text repository to identity first instances of a plurality of words while ignoring single character words and punctuation marks;

add the words associated with the identified first instances of the plurality of words to a list, wherein each word of the plurality of words added to the list is assigned a unique incrementing serial number matching word's order in the list;

replace the plurality of words included in the one or more text documents with the serial numbers corresponding to the words associated with the list for generating one or more reduced documents;

process the one or more text documents sequentially associated with the electronic text repository to identify first instances of one or more duplicate sequences;

add sequences associated with the identified first instances of the one or more duplicate sequences to the list, wherein each sequence of the sequences added to the list is assigned a unique serial number;

replace the sequences of serial numbers included in the one or more text documents with serial numbers corresponding to the sequences of serial numbers associated with the list for generating one or more further reduced documents, wherein the one or more duplicate sequences comprise at least one of words or serial numbers;

responsive to an addition of one or more new documents to the electronic text repository, process the one or more new documents to identify first instances of at least one of new words and new duplicate sequences;

reprocess the one or more text documents included in the electronic text repository, wherein sequences included in the one or more text documents are replaced with serial numbers corresponding to sequences newly added to the list;

add words and sequences associated with the identified first instances to the list, wherein the words and sequences added to the list are assigned unique serial numbers;

apply compression algorithms to the one or more further reduced documents;

receive a request to send the one or more further reduced documents and the list;

responsive to the received request, send the one or more further reduced documents and the list to a user via a network.

6. The computer system of claim 5, further comprising: program instructions programmed to replace serial numbers included in the one or more further reduced documents with corresponding words and sequences associated with the list for making the one or more further reduced documents viewable.

* * * * *